United States Patent [19]
Gold et al.

[11] Patent Number: 5,195,039
[45] Date of Patent: Mar. 16, 1993

[54] HOVER POSITION HOLD SYSTEM FOR ROTARY WINGED AIRCRAFT

[75] Inventors: Phillip J. Gold, Shelton, Conn.; Joseph A. Post, Burke, Va.

[73] Assignee: United Technologies Corporation, Hartford, Conn.

[21] Appl. No.: 518,593

[22] Filed: May 3, 1990

[51] Int. Cl.$^5$ .............................................. B64C 13/16
[52] U.S. Cl. ................................. 364/434; 244/17.13; 244/181
[58] Field of Search ............................ 364/433, 434; 244/17.13, 177, 179, 180, 181, 182

[56] References Cited

U.S. PATENT DOCUMENTS

| | | | |
|---|---|---|---|
| 2,650,046 | 8/1953 | Vanderlip | 244/17.13 |
| 2,873,075 | 2/1959 | Mooers et al. | 244/17.13 |
| 2,998,210 | 8/1961 | Carter, Jr. | 244/77 |
| 3,620,488 | 11/1971 | Miller | 244/17.13 |
| 4,029,271 | 6/1977 | Murphy et al. | 244/17.13 |
| 4,095,759 | 6/1978 | Woitschella et al. | 244/17.17 |
| 4,148,452 | 4/1979 | Niessen et al. | 244/17.13 |
| 4,213,584 | 7/1980 | Tefft et al. | 244/17.13 |
| 4,551,804 | 11/1985 | Clark et al. | 364/434 |
| 4,645,141 | 2/1987 | McElreath | 244/17.13 |
| 4,664,340 | 5/1987 | Jackson | 244/76 |
| 4,697,768 | 10/1987 | Klein | 364/434 |
| 4,740,899 | 4/1988 | McElreath | 364/434 |
| 4,748,569 | 5/1988 | Gordon | 364/462 |
| 4,801,110 | 1/1989 | Skutecki | 244/17.13 |
| 5,001,646 | 3/1991 | Caldwell et al. | 364/434 |

Primary Examiner—Gary Chin

[57] ABSTRACT

A ground-plane-referenced, acceleration signal 2 and Doppler velocity signal 56 are utilized by a complementary filter 6 to provide a complementary velocity signal 8 which is transformed 60 to an inertial coordinate referenced velocity signal 62 utilized in combination with a GPS position signal 56 by a complementary filter 68 to provide a complementary, position error signal 130 that is transformed to a ground-plane-referenced, position error signal 168 and summed with a wind speed signal 196 calculated from the difference between air speed 200 and the aforementioned complementary velocity signal 8 to provide a pitch command signal 202. A similar system is utilized to provide a roll command signal. The system is gated by signals 100, 176 which are determinative of the aircraft meeting predetermined flight conditions 250-262.

8 Claims, 2 Drawing Sheets

HOVER POSITION HOLD SYSTEM FOR ROTARY WINGED AIRCRAFT

TECHNICAL FIELD

This invention relates to automatic flight control systems and more particularly, an automatic, hover hold, flight control system for rotary winged aircraft.

BACKGROUND ART

The utilization of a helicopter frequently involves a hover maneuver in which the helicopter is maintained at a fixed point with respect to the earth and at a low altitude. Controlling the aircraft during a hover is very demanding on the pilot, particularly in gusty wind conditions or tight operating conditions. This workload demand causes fatigue and prevents the pilot from performing any other duties.

Automatic hover position control systems were introduced some time ago in an attempt to reduce pilot workload and fatigue during hovering maneuvers. An example of an existing hover hold system is disclosed in commonly owned U.S. Pat. No. 4,213,584 (Tefft et al). Prior systems, such as Tefft, employ a number of sensor systems, some of which include Doppler radar velocity systems, TACNAV or Global Position Sensing (GPS) systems, accelerometers and wind measuring systems. Unfortunately, prior automatic hover control systems either incorporate a combination of sensor systems which provide inadequate data or they do not utilize the sensor systems they incorporate effectively and, therefore, suffer from a number of deficiencies which severely limit their performance.

One such deficiency is that prior systems do not perform well in either steady wind or gusty conditions because they do not sense wind with the purpose of anticipating its effects on the aircraft. Instead, existing controllers must wait for aircraft velocity and/or integrated velocity errors to develop before compensating for the wind. The subsequent lag in response time causes large position errors and poor hover position hold performance.

Also, inefficiencies in the previously mentioned sensor systems cause prior automatic hover hold control systems to suffer from drift and steady state errors. For instance, prior systems that rely exclusively on Doppler radar systems to measure ground speed experience null shifts and low frequency errors because Doppler systems are inefficient at low aircraft velocities. This adversely affects overall system performance.

Yet another deficiency in prior automatic hover hold control systems arises when aggressive turning maneuvers are performed by the pilot. If the aircraft yaws between 180 to 360 degrees, the integral of ground-plane referenced velocity (which is used for a pseudo-position signal because of the aforementioned TACNAV deficiencies) may go to zero even though a steady inertial position error may be accumulating.

All of the aforementioned deficiencies require pilot intervention, thereby distracting him or her from other duties and causing fatigue. An improved system eliminating these disadvantages is highly desirable.

DISCLOSURE OF THE INVENTION

An object of the present invention is to provide for an improved automatic hover position hold flight control system which accurately maintains aircraft position.

Another object is to provide for a system which directly compensates for wind gusts.

Another object is to provide for a system which allows the pilot to perform aggressive maneuvers in the yaw and collective axes while accurately maintaining position.

Yet another object is to provide for a system which engages and disengages automatically.

According to the present invention, complementary filters calculate ground-plane-referenced longitudinal and lateral velocities from respective longitudinal and lateral Doppler measured velocities and longitudinal and lateral accelerometer measured accelerations. These velocities are transformed to inertial-coordinate-referenced velocities using aircraft heading. Another set of complementary filters calculate aircraft inertial-coordinate-referenced longitudinal and lateral positions using the inertial-coordinate-referenced velocities and position derived by a GPS position sensing system. These inertial-coordinate-referenced positions are transformed back to ground-plane-referenced longitudinal and lateral position signals and summed with calculated wind speed signals derived by comparing measured wind speed with the aforementioned ground-plane-referenced velocities to provide pitch and roll command signals for the aircraft flight control system. Control logic engages the command signals automatically.

The present invention provides a more accurate position hold function than previously attainable. When integrated with an advanced digital flight control system, it will allow the pilot to perform turns and bob-ups while maintaining position automatically. The present invention can be incorporated into existing systems and is easily modifiable.

These and other objects, features and advantages of the present invention will become more apparent in the light of the detailed description of exemplary embodiments thereof, as illustrated by the drawing.

BEST MODE FOR CARRYING OUT THE INVENTION

Hereinafter, an X prefix to a signal name references that signal to the longitudinal axis of the helicopter. A Y prefix references signals to the lateral axis.

Figure 1:
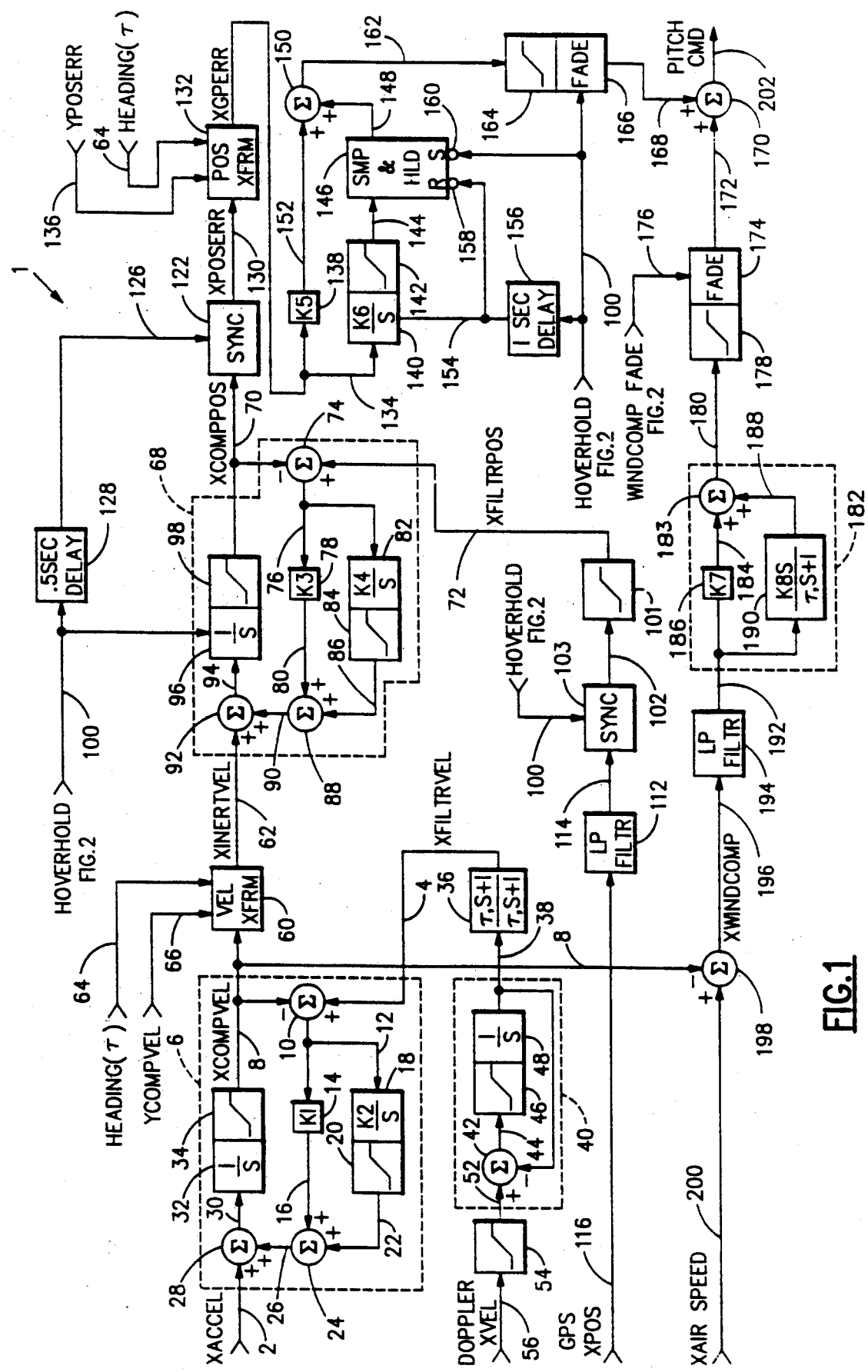
FIG. 1 is a simplified schematic block diagram of the hover hold control system for pitch axis control in accordance with the present invention.

Referring now to FIG. 1, an aircraft pitch command circuit 1 includes an aircraft longitudinal acceleration signal (XACCEL) provided on a line 2 by an acceleration measurement device (not shown), such as an accelerometer, and a filtered, longitudinal, Doppler velocity signal (XFILTRVEL) provided on a line 4 which are combined by a complementary filter 6 to provide a longitudinal, complementary, velocity signal (XCOMPVEL) on a line 8.

Complementary filters are devices known in the prior art which merge two independently generated signals to provide a single output indicative of the high frequency portion of one of the input signals and the low frequency portion of the other, with the characteristic that the input signal providing the high frequency portion is provided in the form of the rate of change of the form of the output. Complementary filter 6, therefore, provides a velocity signal 8 by merging a velocity signal input 56 (for its low frequency data) with an acceleration signal input 2 (for its high frequency data).

A summing junction 10 subtracts XCOMPVEL on line 8 from XFILTRVEL on line 4 to provide a feedback signal on a line 12 to a proportional gain amplifier 14 and an integrator 18. The output of integrator 18 is provided to a limiter 20, which provides an output signal on a line 22 that is added by summing junction 24 to the output of amplifier 14 provided on a line 16 to provide a signal on a line 26 to summing junction 28. Summing junction 28 adds the signal on line 26 to XACCEL on line 2 to provide a signal on a line 30 to an integrator 32. The output of integrator 32 is provided to a limiter 34 which provides XCOMPVEL on line 8.

XFILTRVEL on line 4 is provided by a lead-lag filter 36 whose input is provided on a line 38 by a rate limiter 40. Rate limiter 40 is comprised of a summing junction 42 which provides a signal on a line 44 to a limiter 46 that provides a signal to an integrator 48, the output of which is fed back on line 38 to summing junction 42. Summing junction 42 subtracts the feedback on line 38 from a signal on a line 52 provided by a limiter 54. Limiter circuit 54 is provided an aircraft longitudinal, velocity signal (DOPPLER XVEL) on a line 56 by a velocity measurement system (not shown), such as a Doppler radar system.

A velocity transformation circuit 60 transforms signal XCOMPVEL on line 8, which is a ground-plane-referenced signal, to an inertial-coordinate-referenced, longitudinal, complementary, velocity signal (XINERTVEL) provided on a line 62 by utilizing aircraft heading according to the following equation:

$$XINERTVEL = XCOMPVEL * COS(\Psi) - YCOMPVEL * SIN(\Psi)$$

where:
XINERTVEL = inertial-coordinate-referenced, longitudinal, complementary, velocity signal provided on line 8;
XCOMPVEL = ground-plane-referenced, longitudinal, complementary, velocity signal provided on line 8;
$\Psi$ = HEADING signal indicative of aircraft heading with the respect to magnetic north provided on a line 64 by a heading measurement device, such as a compass;
YCOMPVEL = ground-plane-referenced, lateral, complementary, velocity signal provided on a line 66 by a complementary filter identical to filter 6 but utilizing lateral acceleration and filtered lateral Doppler velocity inputs.

A complementary filter 68 similar to filter 6 utilizes XINERTVEL on line 62 and a filtered, longitudinal, GPS position signal (FILTRPOS) on a line 72 to provide an inertial-coordinate-referenced, longitudinal, complementary, position signal (XCOMPPOS) on a line 70.

A summing junction 74 subtracts XCOMPPOS on line 70 from XFILTRPOS on line 72 to provide a feedback signal on a line 76 to a proportional gain amplifier 78, which provides an output on a line 80, and an integrator 82, which provides an output signal to a limiter 84. Limiter 84 provides a signal on a line 86 which is added to the signal on line 80 by a summing junction 88 to provide a signal on a line 90 to a summing junction 92. Summing junction 92 adds the signal on line 90 with XINERTVEL on line 62 to provide a signal on a line 94 to an integrator 96. The output of integrator 96 is provided to a limiter 98 which provides XCOMPPOS on line 70.

Integrator 96 is controlled by a binary HOVERHOLD signal (described in further detail in FIG. 2) provided on a line 100. A logic high HOVERHOLD signal indicates the flight parameters of the aircraft are acceptable for engagement of the hoverhold system of the present invention. Integrator 96 integrates the signal provided on line 94 when HOVERHOLD is a logic high and provides a zero magnitude output when HOVERHOLD is a logic low.

XFILTRPOS on line 72 is a filtered, longitudinal, GPS position signal provided by the output of a limiter 102 which is provided a position error signal on a line 104 by a synchronizing circuit 108. Synchronizer 108 is provided a signal on a line 114 from the output of a low pass filter that filters noise from a longitudinal position signal (GPS XPOS) provided on a line 116 by a position sensing system (not shown), such as a GPS or TACNAV system. Synchronizer circuit 108 provides an error signal as the difference between a desired position and current position and is controlled by the HOVERHOLD signal provided on line 100. When HOVERHOLD is a logic low, the synchronizer 108 provides zero output. When HOVERHOLD is a logic high, synchronizer 108 provides a position error signal indicative of the difference between the aircraft's longitudinal position at the HOVERHOLD low to high transition and the current longitudinal position.

The inertial-coordinate-referenced, longitudinal, complementary, position signal, XCOMPPOS on line 70 is provided to a synchronizer circuit 122. Synchronizer 122 works similarly to circuit 108 with the exception that it is controlled by a delayed HOVERHOLD signal provided on a line 126 by a delay circuit 128 which delays transitions of HOVERHOLD provided on line 100 by one half second. Synchronizer 122, therefore, provides an inertial-coordinate-referenced, complementary, longitudinal, position error signal (XPOSERR) on a line 130 indicative of the drift in aircraft longitudinal position from the position when the aircraft entered into hover.

The XPOSERR signal on line 130 is provided to a transformation circuit 132 which transforms the inertial-coordinate-referenced signal XPOSERR to a ground-plane-referenced signal (XGPERR) provided on a line 134 by utilizing aircraft heading according to the following equation:

$$XGPERR = XPOSERR * COS(\Psi) + YPOSERR * SIN(\Psi)$$

where:
XGPERR = ground-plane-referenced, complementary, longitudinal, position error signal provided on line 134
XPOSERR = inertial-coordinate-referenced, complementary, longitudinal, position error signal provided on line 130
YPOSERR = inertial-coordinate-referenced, complementary, lateral, position error signal provided on a line 136 by a circuit similar to FIG. 1 but utilizing lateral acceleration, velocity, GPS position, and airspeed inputs Ψ = heading angle provided on line 64 and described hereinbefore XGPERR on line 134 is provided to a proportional gain amplifier 138 and an integrator 140. The output of integrator 140 is provided to a limiter 142 which provides a signal on a line 144 to a sample & hold circuit 146. The output of circuit 146 is provided on a line 148 to a summing junction 150.

Integrator circuit 140 is controlled by a delayed HOVERHOLD signal provided on a line 154 by a delay circuit 156 which delays HOVERHOLD transitions provided on line 100 by one second.

Sample & hold circuit 146 is controlled by the outputs of two inverters 158, 160. Inverter 158 inverts the delayed HOVERHOLD signal on line 154 and provides a reset signal (R) to circuit 146. Inverter 160 inverts the HOVERHOLD signal on line 100 and provides a sample & hold signal (S) to circuit 146.

When HOVERHOLD transitions from logic low to logic high, inverter 160 commands circuit 146 into a "follow" mode wherein the circuit functions as a unitary gain amplifier. After a one second delay, integrator 140 is commanded by delay circuit 156 to begin integrating the signal provided on line 134. Delay circuit 156 gives the proportional path signal time to reach the correct magnitude before integrator 140 starts integrating in order to prevent "rocking" motion.

When HOVERHOLD on line 100 transitions from high to low, inverter 160 commands circuit 146 into a "sample and hold" mode wherein the signal on line 144 is sampled and the value held on line 148. After a one second delay, inverter 158 resets circuit 146 to zero and delay circuit 156 commands integrator 140 to stop integrating (i.e. the output goes to zero). Sample and hold circuit 146 minimizes transients when the aircraft goes in and out of a hover.

Summing junction 150 adds the output of sample & hold circuit provided on a line 148 with the output of proportional gain amplifier 138 provided on a line 152 and provides the added signal on a line 162 to a limiter 164. The output of limiter 164 is provided to a FADE circuit 166 which provides a signal on a line 168 to a summing junction 170.

The FADE circuit 166 is controlled by HOVERHOLD on line 100. When HOVERHOLD transitions from low to high, the gain of FADE circuit 166 changes from zero to one linearly with time over a one second interval. When HOVERHOLD transitions from high to low, the gain changes conversely from one to zero. Circuit 166, consequently, fades the signal provided by limiter 164 in and out as the aircraft goes in and out of a hover and prevents large transients from appearing on line 168.

The summing junction 170 adds the position error signal provided on line 168 with a conditioned wind compensation signal provided on a line 172 by a FADE circuit 174. Circuit 174 functions similarly to circuit 166 but is controlled by a digital WINDCOMP FADE signal (described in detail in FIG. 2) provided on a line 176. The input to FADE circuit 174 is provided by a limiter 178 which conditions the signal provided on a line 180 by a derivative function circuit 182 comprising a summing junction 183 which adds a signal provided on a line 184 by a proportional gain amplifier 186 to a signal on a line 188 provided by a lead-lag rate circuit 190. Derivative function circuit 182 "boosts" the signal provided on line 196 when it changes rapidly and consequently provides better aircraft hover response to wind gusts. Summing junction 170, therefore, alters the aircraft position error signal in order to anticipate the effects of wind on the aircraft.

The input to circuits 186 and 190 is provided on a line 192 by a low pass filter 194. Filter 194 filters a calculated, longitudinal, wind compensation signal (XWINDCOMP) provided on a line 196 provided by a summing junction 198 which subtracts XCOMPVEL on line 8 from a longitudinal air speed signal XAIRSPEED provided on a line 200 by an air speed measuring system (not shown), such as the Omnidirectional Air Data System manufactured by PACER Systems, Inc.

The output of summing junction 170 is a pitch command signal (PITCH CMD) provided on a line 202 utilized by a flight control system (not shown) to control aircraft longitudinal position.

A similar circuit to pitch command circuit 1 must be used to provide a roll command signal to the aircraft flight control system for controlling aircraft lateral position. The only differences between the roll command circuit and the pitch command circuit 1 are: a) the acceleration, velocity, position, and air speed inputs (the roll command circuit counterparts of the signals on lines 2, 56, 116, and 200) are indicative of parameters in the lateral axis of the aircraft; b) the lateral velocity transformation circuit (roll counterpart of circuit 60) calculates an inertial-coordinate-referenced, lateral, complementary, velocity signal YINERTVEL (roll counterpart of the signal on line 8) according to the equation:

$$YINERTVEL = XCOMPVEL*SIN(\Psi) + YCOMPVEL*COS(\Psi);$$

c) the position transformation circuit (roll counterpart of circuit 132) calculates a ground-plane-referenced, lateral, complementary, position error signal YGPERR (roll counterpart of the signal on line 134) according to the equation:

$$YGPERR = -XPOSERR*SIN(\Psi) + YPOSERR*COS(\Psi).$$

Figure 2:
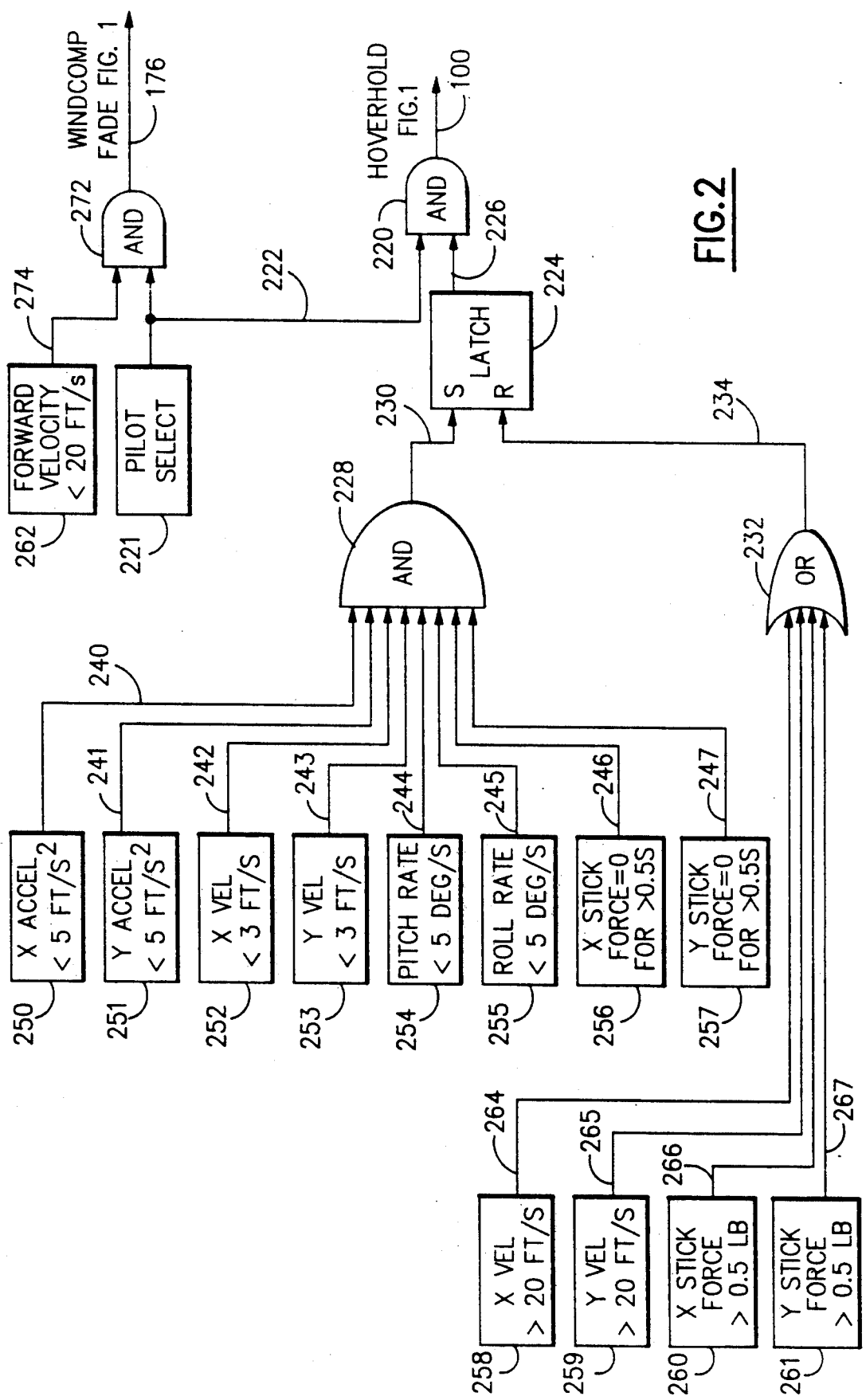
FIG. 2 is a simplified schematic diagram of the control logic for the hover hold system of FIG. 1.

Referring now to FIG. 2, the HOVERHOLD signal utilized by both the pitch command circuit 1 (line 100) and the aforementioned roll command circuit is provided by an AND circuit 220 which provides a logic high on line 100 when the output of a PILOT SELECT circuit 221 provided on a line 222 and the output of a LATCH circuit 224 provided on a line 226 are logic high.

The PILOT SELECT circuit 221 (not shown in detail herein) may be one of the many switches well known in the prior art which provides the pilot with a means to activate the automatic hover hold system of the present invention.

The LATCH circuit 224 is a bistable device having a set (S) control input and a reset (R) control input. The S input of latch circuit 224 is controlled by the output of an AND circuit 228 provided on a line 230 and the R input is controlled by the output of an OR circuit 232 provided on a line 234. When the set signal on line 230 transitions from logic low to logic high, the LATCH output signal on line 226 is set to logic high. A transition of the reset signal on line 234 from logic low to logic high resets the LATCH output signal on line 226 to logic low.

The AND circuit 228 has eight inputs provided on lines 240-247 by comparator circuits 250-257. AND circuit 228 provides a logic high signal on line 230 when the signals on lines 240-247 are logic high. Comparators 250,251 provide logic high outputs when the aircraft longitudinal and lateral accelerations, respectively, are less than five feet per second squared. Comparators 252,253 provide logic high outputs when the aircraft longitudinal and lateral velocities, respectively, are less than three feet per second. Comparators 254,255 provide logic high outputs when the aircraft pitch and roll rates, respectively, are less than five degrees per second. Comparators 256,257 provide logic high outputs when the force applied by the pilot to the flight control stick in the pitch and roll axes, respectively, is zero for more than one half second.

The OR circuit 232 is provided four inputs on lines 264-267 by comparator circuits 258-261, respectively. The OR circuit 232 provides a logic high signal on line 234 whenever any one of lines 264-267 is a logic high. Comparators 258,259 provide logic high signals when the longitudinal and lateral velocity, respectively, of the aircraft are greater than 20 feet per second. Comparators 260,261 provide respective logic high signals when the pilot displaces the flight control stick in the pitch and roll axes respectively greater than one percent of its total travel in the respective axis.

The WINDCOMP FADE signal utilized by the pitch and roll command circuits is provided on line 176 by an AND circuit 272 which has two inputs provided on lines 274,222 by comparator circuit 262 and PILOT SELECT circuit 221, respectively. The output of comparator circuit 262 is a logic high when the forward velocity of the aircraft is less than twenty feet per second.

The hover hold system of the present invention, therefore, engages automatically if the pilot has engaged the PILOT SELECT circuit and the conditions of comparator circuits 250-257 have been met. The system disengages if PILOT SELECT is disengaged or any one of the conditions of comparators 258-261 are met.

Comparator circuits 250-262 are not shown in detail, but may be any of a number of circuits well known in the prior art which compare an input parameter signal with a predetermined threshold limit to provide a logic high digital output signal if the threshold limit is exceeded.

The present invention may be implemented using analog circuitry, dedicated digital circuitry or as a software program using circuit designs well known in the prior art. The equivalence between analog, dedicated digital and software is illustrated (in a different context) in U.S. Pat. No. 4,294,162 (Fowler et al).

The invention may be implemented with a variety of delay times, various types of filtering and limiting, and other known design characteristics, to suit any implementation thereof. Although the invention has been shown and described with exemplary embodiments thereof, it should be understood by those skilled in the art that the foregoing and various other changes, omissions and additions may be made therein and thereto without departing from the spirit and scope of the invention.

We claim:

1. A helicopter position hold control system for providing pitch and roll command signals during a hover comprising:

- acceleration sensing means for providing ground-plane-referenced acceleration signals indicative of the longitudinal and lateral accelerations of the helicopter;
- velocity sensing means for providing ground-plane-referenced velocity signals indicative of the longitudinal and lateral velocities of the helicopter;
- position sensing means for providing ground-plane-referenced longitudinal and lateral position error signals indicative of the difference between the position of the aircraft and a predetermined position;
- longitudinal and lateral air speed sensing means for providing longitudinal and lateral air speed signals indicative of the longitudinal and lateral air speed of the helicopter;
- heading sensing means for providing a heading signal the magnitude ($\Psi$) of which is indicative of the heading of the helicopter with reference to a point;
- velocity complementary filter means responsive to said acceleration signals and said velocity signals for providing ground-plane-referenced complementary longitudinal and lateral velocity signals the magnitudes (XCOMPVEL, YCOMPVEL) of which are indicative of the high frequency portion of the integral of said ground-plane-referenced acceleration signals and the low frequency portion of said ground-plane-referenced velocity signals respectively;
- velocity transformation means responsive to said complementary velocity signals and said heading signal for transforming said complementary velocity signals into inertial-coordinate-referenced complementary velocity signals (XINERTVEL, YINERTVEL) according to the equations:

$$\text{XINERTVEL} = \text{XCOMPVEL}^*\cos(\Psi) - \text{YCOMPVEL}^*\sin(\Psi)$$

$$\text{YINERTVEL} = \text{XCOMPVEL}^*\sin(\Psi) + \text{YCOMPVEL}^*\cos(\Psi);$$

- position complementary filter means responsive to said inertial-coordinate-referenced, complementary velocity signals and said position error signals for providing inertial-coordinate-referenced, complementary longitudinal and lateral position signals indicative of the high frequency portion of the integral of said inertial-coordinate-referenced complementary velocity signals and the low frequency portion of said position error signals;
- synchronization means responsive to said complementary longitudinal and lateral position signals for providing complementary longitudinal and lateral position error signals the magnitudes (XPOSERR, YPOSERR) of which are indicative of the difference between the actual longitudinal and lateral complementary position and a predetermined longitudinal and lateral complementary position;
- position transformation means responsive to said complementary position error signals and said heading signal for transforming said complementary position error signals to ground-plane-referenced complementary longitudinal and lateral position error signals (XGPERR, YGPERR) according to the equations:

$$\text{XGPERR} = \text{XPOSERR}^*\cos(\Psi) + \text{YPOSERR}^*\sin(\Psi)$$

$$XGPERR = XPOSERR*SIN(\Psi) + YPOSERR*COS(\Psi);$$

and pitch and roll command signal means responsive to said ground-plane-referenced complementary position error signals for providing the pitch and roll command signals to control said helicopter position hold during said hover.

2. The helicopter hover hold control system for providing pitch and roll command signals during a hover according to claim 1, further comprising:

wind sensing means responsive to said air speed signals and said inertial-coordinate-reference velocity signals for providing longitudinal and lateral wind speed signals indicative of the wind speed in the longitudinal and lateral axes of the helicopter;

wherein said pitch and roll command signal means is responsive to said ground-plane-referenced complementary position error signals and said wind speed signals for providing the pitch and roll command signals.

3. The helicopter hover hold control system according to claim 1, further comprising:

pitch and roll rate sensing means for providing pitch and roll rate signals indicative of the pitch and roll rates of the helicopter;

stick force sensing means for providing a stick force signal indicative of the force applied to the helicopter control stick; and gating means responsive to said acceleration signals, said ground-plane-referenced velocity signals, including said ground-plane-referenced complementary velocity signals, said pitch and roll rate signals and said stick force signal for automatically engaging and disengaging said pitch and roll command signals.

4. The helicopter hover hold control system according to claim 1 wherein:

said velocity complementary filter means comprises: a) first summing junction means for providing a first summed signal indicative of the sum of said ground-plane-referenced velocity signal and said ground-plane-referenced complementary velocity signal; b) first proportional gain means for providing a first gain signal proportional to said first summed signal; c) first integrator means for providing a first integral signal indicative of the integral of said first summed signal; d) first limiter means for providing a first limit signal indicative of said first integral signal limited within a first predetermined function curves; e) second summing junction means for providing a second summed signal indicative of the sum of said first limit signal and said gain signal; f) third summing junction means for providing a third summed signal indicative of the sum of said second summed signal and said ground-plane-referenced acceleration signal; g) second integrator means for providing a second integral signal indicative of the integral of said third summed signal; h) second limiter means for providing said ground-plane-referenced complementary velocity signal indicative of said second integral signal limited within a second predetermined function curve; and said position complementary filter means comprises: a) fourth summing function means for providing a fourth summed signal indicative of the sum of said inertial-coordinate-referenced complementary position signal and said ground-plane-referenced position error signal; b) second proportional gain means for providing a second gain signal proportional to said fourth summed signal; c) third integrator means for providing a third integral signal indicative of the integral of said fourth summed signal; d) third limiter means for providing a third limit signal indicative of said third integral signal limited within a third predetermined function curve; e) fifth summing junction means for providing a fifth summed signal indicative of the sum of said third limit signal and said second gain signal; f) sixth summing junction means for providing a sixth summed signal indicative of the sum of said fifth summed signal and said inertial-coordinate-referenced velocity signal; g) fourth integrator means for providing a fourth integral signal indicative of the integral of said sixth summed signal; h) fourth limiter means for providing said inertial-coordinate-referenced complementary position signal indicative of said fourth integral signal limited within a fourth predetermined function curve.

5. The helicopter hover hold control system according to claim 2 further comprising:

means for fading said ground-plane-referenced position error signals and said wind speed signals in and out as a function of time.

6. In a method for determining pitch and roll commands for a helicopter during a hover, the steps of:

merging the high frequency portion of the integral of the helicopter longitudinal and lateral accelerations with the low frequency portion of the respective longitudinal and lateral velocities;

transforming said merged longitudinal and lateral velocities to inertial-coordinate-reference velocities using helicopter heading;

comparing current longitudinal and lateral helicopter positions with predetermined respective longitudinal and lateral positions ad providing respective longitudinal and lateral position errors therefrom;

merging the high frequency portion of the integral of said inertial-coordinate-referenced longitudinal and lateral velocities with the low frequency portion of the respective said longitudinal and lateral position errors and providing respective merged longitudinal and lateral complementary positions therefrom;

comparing said merged longitudinal and lateral complementary positions with predetermined merged positions and providing inertial-coordinate-referenced longitudinal and lateral complementary position errors therefrom;

transforming said inertial-coordinate-referenced longitudinal and lateral complementary position errors to ground-plane-referenced pitch and roll commands using the heading of said helicopter, wherein the step of transforming said inertial-coordinate-referenced complementary longitudinal and lateral position errors to said ground-plane-referenced pitch and roll commands includes the intermediate step of transforming said inertial-coordinate-referenced complementary longitudinal and lateral position errors to ground-plane-referenced complementary longitudinal and lateral position errors and including the further step of summing longitudinal and lateral wind speeds with said ground-plane-referenced complementary longitudinal and lateral position errors to provide said ground-plane-referenced pitch and roll commands; and using said pitch and roll commands to provide hover position hold.

7. A position hold control system for providing pitch and roll command signals for a helicopter flight control system to control helicopter position hold during a hover comprising:

acceleration sensing means for providing ground-plane-referenced acceleration signals indicative of the longitudinal and lateral accelerations of the helicopter;

velocity sensing means for providing ground-plane-referenced velocity signals indicative of the longitudinal and lateral velocities of the helicopter;

position sensing means for providing ground-plane-referenced longitudinal and lateral position error signals indicative of the difference between the position of the aircraft and a predetermined position;

longitudinal and lateral air speed sensing means for providing longitudinal and lateral air speed signals indicative of the longitudinal and lateral air speed of the helicopter;

heading sensing means for providing a heading signal the magnitude ($\Psi$) of which is indicative of the heading of the helicopter with reference to a point;

velocity complementary filter means responsive to said acceleration signals and said velocity signals for providing ground-plane-referenced complementary longitudinal and lateral velocity signals on magnitudes (XCOMPVEL, YCOMPVEL) of which are indicative of the high frequency portion of the integral of said ground-plane-referenced acceleration signals and the low frequency portion of said ground-plane-referenced velocity signals respectively;

velocity transformation means responsive to said complementary velocity signals and said heading signal for transforming said complementary velocity signals into inertial-coordinate referenced complementary velocity signals (XINERTVEL, YINERTVEL) according to the equations:

XINERTVEL=XCOMPVEL*COS($\Psi$-)−YCOMPVEL*SIN($\Psi$)

YINERTVEL=XCOMPVEL*SIN($\Psi$)+YCOMPVEL*COS($\Psi$);

position complementary filter means responsive to said inertial-coordinate-referenced, complementary velocity signals and said position error signals for providing inertial-coordinate-referenced, complementary longitudinal and lateral position signals indicative of the high frequency portion of the integral of said inertial-coordinate-referenced complementary velocity signals and the low frequency portion of said position error signals;

synchronization means responsive to said complementary longitudinal and lateral position signals for providing complementary longitudinal and lateral position error signals the magnitudes (XPOSERR, YPOSERR) of which are indicative of the difference between the actual longitudinal and lateral complementary position and a predetermined longitudinal and lateral complementary position;

position transformation means responsive to said complementary position error signals and said heading signal for transforming said complementary position error signals to ground-plane-referenced complementary longitudinal and lateral position error signals (XGPERR, YGPERR) according to the equations:

XGPERR=XPOSERR*COS($\Psi$)+YPOSERR*SIN($\Psi$)

XGPERR=XPOSERR*SIN($\Psi$)+YPOSERR*COS($\Psi$);

pitch and roll command signal means responsive to said ground-plane-referenced complementary position error signals for providing the pitch and roll command signals; and means for providing said pitch and roll command signals to the flight control system to control a said helicopter position holding during said hover.

8. In a method for determining pitch and roll commands for a flight control system to provide automatic position hold for a helicopter during a hover, the steps of:

merging the high frequency portion of the integral of the helicopter longitudinal and lateral accelerations with the low frequency portion of the respective longitudinal and lateral velocities;

transforming said merged longitudinal and lateral velocities to inertial-coordinate-reference velocities using helicopter heading;

comparing current longitudinal and lateral helicopter positions with predetermined respective longitudinal and lateral positions and providing respective longitudinal and lateral position errors therefrom;

merging the high frequency portion of the integral of said inertial-coordinate-referenced longitudinal and lateral velocities with the low frequency portion of the respective said longitudinal and lateral position errors and providing respective merged longitudinal and lateral complementary positions therefrom;

comparing said merged longitudinal and lateral complementary positions with predetermined merged positions and providing inertial-coordinate-referenced longitudinal and lateral complementary position errors therefrom;

transforming said inertial-coordinate-referenced longitudinal and lateral complementary position errors to ground-plane-reference pitch and roll commands using the heading of said helicopter; and using said pitch and roll commands with the flight control system to provide hover position hold.

* * * * *

UNITED STATES PATENT AND TRADEMARK OFFICE
CERTIFICATE OF CORRECTION

PATENT NO. : 5,195,039

DATED : March 16, 1993

INVENTOR(S) : Phillip J. Gold, Et Al

It is certified that error appears in the above-identified patent and that said Letters Patent is hereby corrected as shown below:

Claim 4, column 9, line 67, "function" should read --junction--

Claim 6, column 10, line 40, following positions "ad" should read --and--

Claim 7, column 11, line 33, following signals "on" should --the--

Signed and Sealed this

Twenty-fifth Day of January, 1994

Attest:

BRUCE LEHMAN

Attesting Officer

Commissioner of Patents and Trademarks